(12) United States Patent
Urbanski et al.

(10) Patent No.: US 10,086,869 B2
(45) Date of Patent: Oct. 2, 2018

(54) STEERING STABILIZER FOR A MOTOR VEHICLE

(71) Applicant: Tenneco Automotive Operating Company Inc., Lake Forest, IL (US)

(72) Inventors: Katie Urbanski, Monroe, MI (US); Anthony Morr, Monroe, MI (US); Michael Golin, Dexter, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 7 days.

(21) Appl. No.: 15/189,574

(22) Filed: Jun. 22, 2016

(65) Prior Publication Data

US 2017/0369098 A1     Dec. 28, 2017

(51) Int. Cl.
   B62D 7/22     (2006.01)
   F16F 13/00    (2006.01)

(52) U.S. Cl.
   CPC .............. B62D 7/22 (2013.01); B62D 7/228 (2013.01); F16F 13/007 (2013.01)

(58) Field of Classification Search
   CPC combination set(s) only.
   See application file for complete search history.

(56) References Cited

U.S. PATENT DOCUMENTS

| | | | | |
|---|---|---|---|---|
| 3,332,677 A * | 7/1967 | Long, Jr. | ............ | B60G 17/0272 267/34 |
| 3,347,541 A * | 10/1967 | Buccino | .................... | F16F 9/58 267/220 |
| 3,871,682 A * | 3/1975 | Kirschner | ............ | B60G 15/063 267/64.19 |
| 3,892,397 A * | 7/1975 | Nicholls | ............... | B60G 15/063 267/195 |
| 4,256,292 A * | 3/1981 | Sullivan, Jr. | ......... | B60G 13/003 188/268 |
| 4,795,010 A * | 1/1989 | Kaneko | ................ | B60G 15/063 188/322.19 |
| 4,962,834 A | 10/1990 | Miner | | |
| 5,133,573 A * | 7/1992 | Kijima | ................. | B60G 15/068 267/220 |

(Continued)

FOREIGN PATENT DOCUMENTS

| | | | | |
|---|---|---|---|---|
| DE | 19506699 A1 * | 4/1996 | ........... | B60G 15/063 |
| DE | 19748634 A1 * | 5/1998 | ........... | B60G 15/063 |

(Continued)

*Primary Examiner* — Nicole T Verley
(74) *Attorney, Agent, or Firm* — Harness, Dickey & Pierce, P.L.C.

(57) ABSTRACT

The present disclosure relates to a steering stabilizer for a vehicle. The stabilizer has a damper having a housing, a piston rod extending telescopically from the housing, and a coil spring disposed over the damper. An inner adapter assembly secures a first end of the damper to one of a wheel component or a body component of the vehicle. An outer adapter assembly is coupled to a distal end of the piston rod and couples to the other one of the wheel or body component. A one-piece spring seat is fixedly coupled to the housing. The coil spring is supported at a first end by the spring seat and at a second end by the outer adapter assembly. The spring seat enables the single coil spring to return the steering stabilizer to a central position regardless of whether the single coil spring is under tension or compression.

12 Claims, 6 Drawing Sheets

(56) References Cited

U.S. PATENT DOCUMENTS

| | | | |
|---|---|---|---|
| 5,722,645 A | | 3/1998 | Reitter |
| 5,975,505 A | * | 11/1999 | Yoshimoto ............ B60G 15/068 |
| | | | 267/141.1 |
| 6,030,570 A | | 2/2000 | McLaughlin |
| 6,755,403 B2 | | 6/2004 | Lewis et al. |
| 6,793,049 B2 | | 9/2004 | Kazmirski |
| 6,854,917 B2 | | 2/2005 | Kraine, Jr. et al. |
| 6,966,567 B2 | | 11/2005 | McLaughlin |
| 7,163,216 B2 | | 1/2007 | McLaughlin |
| 7,527,252 B2 | | 5/2009 | Oohashi |
| 7,631,882 B2 | * | 12/2009 | Hirao ..................... B60G 11/16 |
| | | | 267/166 |
| 8,196,942 B2 | | 6/2012 | Heeren et al. |
| 9,188,184 B2 | | 11/2015 | Adoline et al. |
| 9,261,134 B2 | * | 2/2016 | Morishige ............... F16C 17/04 |
| 2002/0038929 A1 | * | 4/2002 | Now .................... B60G 15/065 |
| | | | 267/217 |
| 2005/0029723 A1 | | 2/2005 | Lewis et al. |
| 2005/0127587 A1 | | 6/2005 | Nagai |
| 2006/0038363 A1 | | 2/2006 | Park |
| 2010/0059958 A1 | | 3/2010 | Johnston et al. |
| 2015/0354629 A1 | * | 12/2015 | Sakairi .................... F16C 17/10 |
| | | | 384/420 |
| 2016/0082800 A1 | * | 3/2016 | Sakairi .................... F16C 17/10 |
| | | | 384/297 |
| 2016/0185177 A1 | * | 6/2016 | Kaneko ................ F16F 9/3235 |
| | | | 267/221 |

FOREIGN PATENT DOCUMENTS

| | | | | | |
|---|---|---|---|---|---|
| GB | | 810271 A | * | 3/1959 | ........... B60G 15/063 |
| GB | | 1033073 A | * | 6/1966 | ........... B60G 13/003 |
| GB | | 2093157 A | * | 8/1982 | ........... B60G 13/006 |

\* cited by examiner

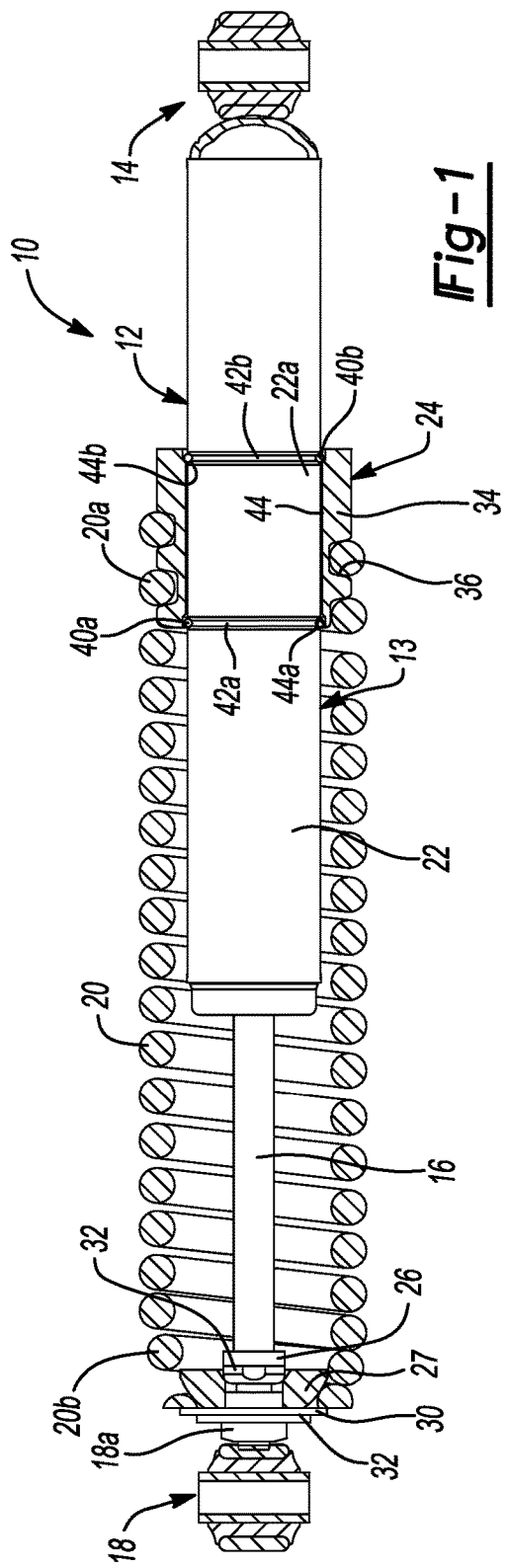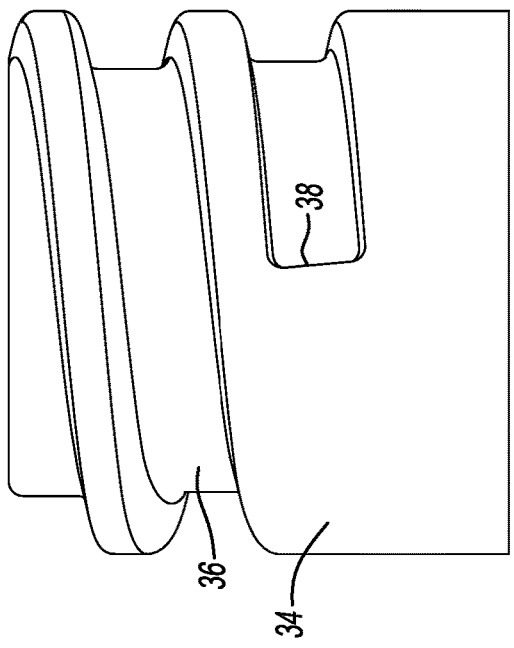

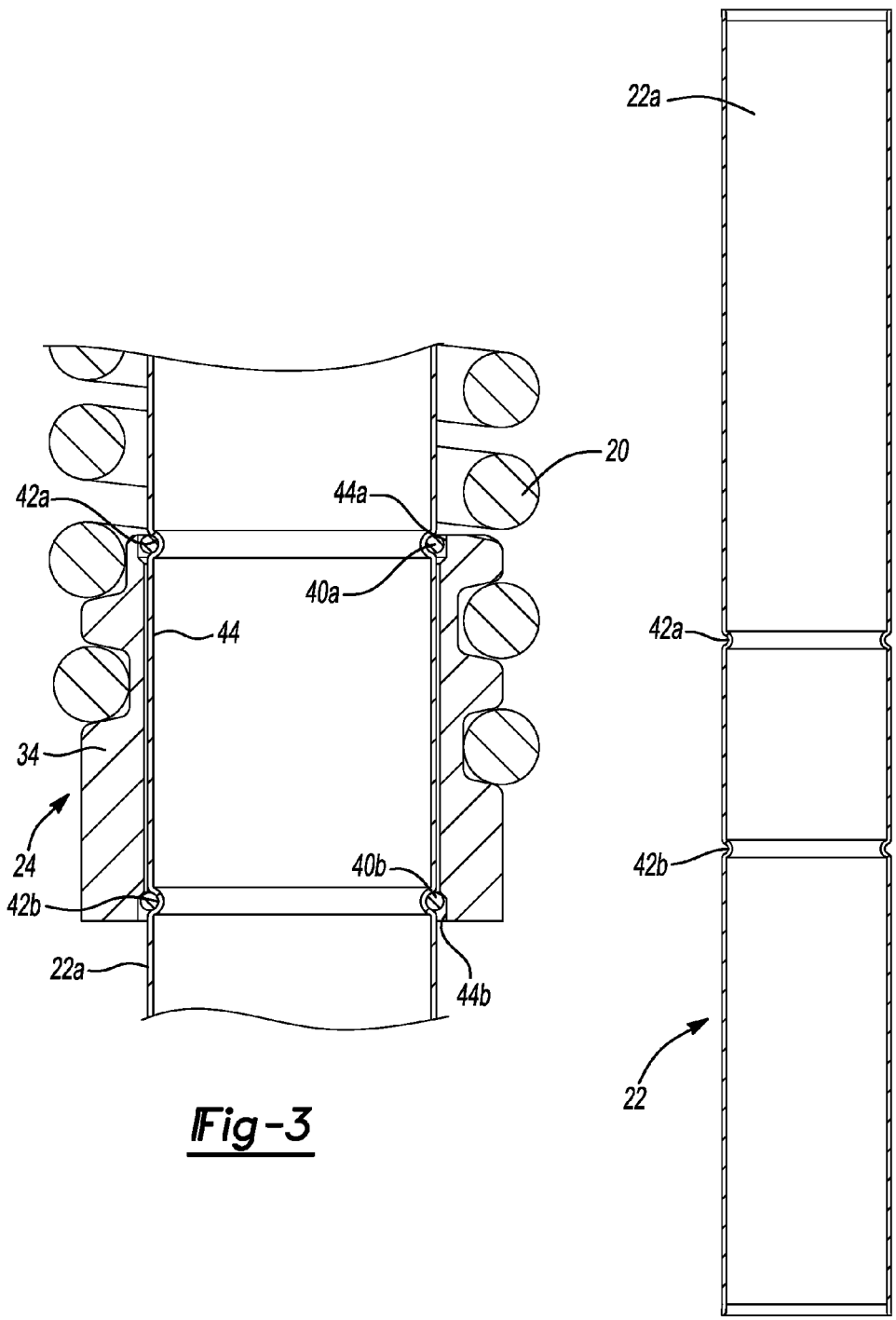

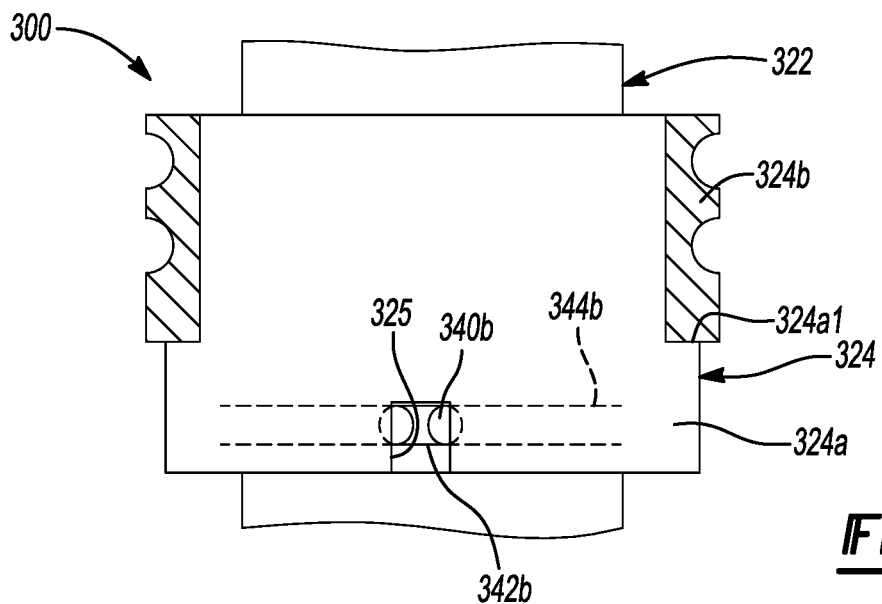
Fig-10
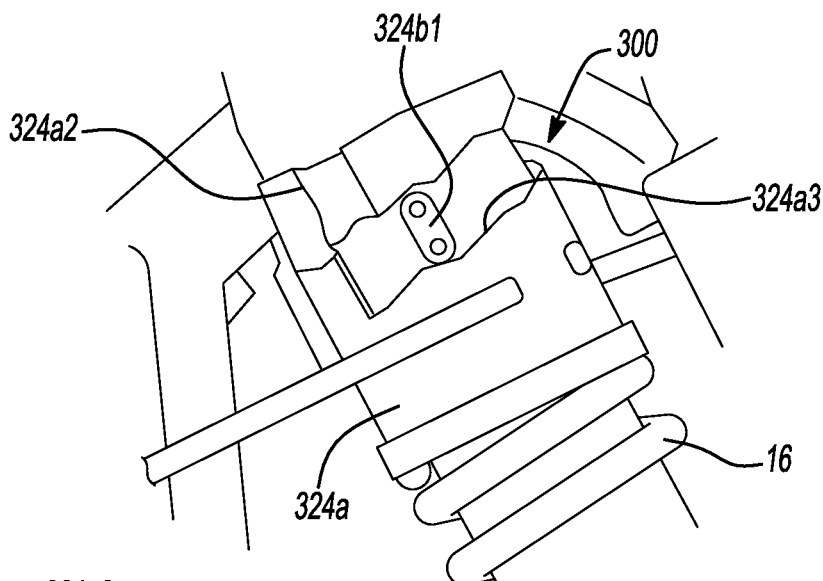
Fig-11
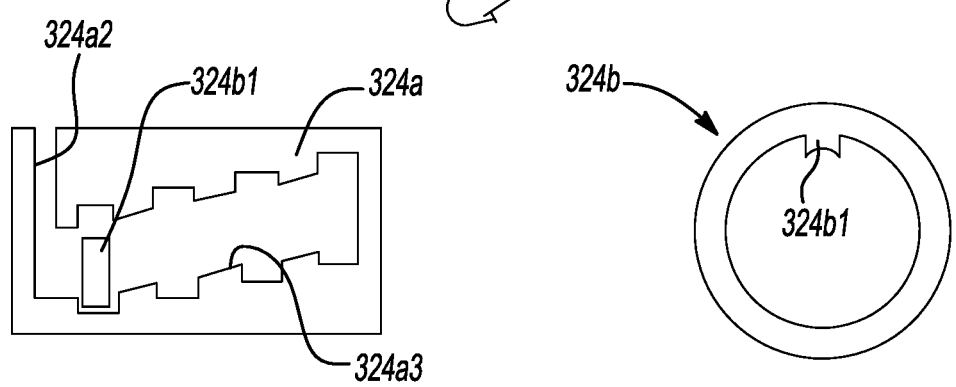
Fig-12
Fig-13

STEERING STABILIZER FOR A MOTOR VEHICLE

FIELD

The present disclosure relates to steering stabilizers used with motor vehicles such as cars, trucks, off road vehicles, recreational vehicles, etc., and more particularly to a steering stabilizer having a one-piece construction that enables the steering stabilizer to return to a center position when no steering torque is being applied to a steering system of the vehicle.

BACKGROUND

This section provides background information related to the present disclosure which is not necessarily prior art.

Steering stabilizers are used with motor vehicles, and especially with vehicles having large wheels and tires such as SUVs, vans, trucks, recreational vehicles, off road vehicles, etc. A steering stabilizer can help to reduce vibration caused by large wheels and tires and generally to improve the overall ride and handling of a vehicle. However, most steering stabilizers do not incorporate any means of automatically assisting with returning the stabilizer to a center or neutral position once the driver turns the steering wheel to a neutral position. Moreover, many present day steering stabilizers are of a two-piece, clamshell-like configuration, typically formed by a two-piece aluminum casting, in which fastening implements (e.g., threaded fasteners such as spring collar screws) are used to hold the two pieces of the assembly together on the damper. Assembling the spring seat on the damper takes time, and the possibility exists for one or more of the fasteners to become stripped if not threaded in properly during assembly.

SUMMARY

This section provides a general summary of the disclosure, and is not a comprehensive disclosure of its full scope or all of its features.

The present disclosure relates to a steering stabilizer for a vehicle. The steering stabilizer may comprise a damper having a housing and a piston rod extending telescopically from the housing. A coil spring may be disposed over the damper. An inner adapter assembly is operably associated with the damper for securing a first end of the damper to one of a wheel component or a body component of the vehicle. An outer adapter assembly is operably coupled to a distal end of the piston rod for coupling to the other one of the wheel component or the body component of the vehicle. A one-piece spring seat is fixedly coupled to the housing of the damper so as to be held stationary, axially, relative to the housing. A coil spring is included which is supported at a first end by the one-piece spring seat and at a second end by the outer adapter assembly. The one-piece spring seat enables the coil spring to return the steering stabilizer to a neutral or central position when a neutral steering input is applied by an operator of the vehicle, regardless of whether the coil spring is under tension or compression.

In another aspect the present disclosure relates to a steering stabilizer for a vehicle. The system may comprise a damper having a housing and a piston rod extending telescopically from the housing. A coil spring may be included which is disposed over the damper. An inner adapter assembly is operably associated with the damper for securing a first end of the damper to one of a wheel component or a body component of the vehicle. An outer adapter assembly is operably coupled to a distal end of the piston rod for coupling to the other one of the wheel component or the body component of the vehicle. A one-piece tubular spring seat is fixedly coupled to the housing of the damper so as to be held stationary, axially, relative to the housing. The one-piece tubular spring seat may include at least one retaining ring, a first groove formed on an outer surface of the housing of the damper, and a second groove formed on an inner surface of the one-piece spring seat. The at least one retaining ring engages both of the first and second grooves to hold the one-piece tubular spring seat stationary on the housing. A coil spring is supported at a first end by the one-piece spring seat and at a second end by the outer adapter assembly. The one-piece spring seat enables the coil spring to return the steering stabilizer to a neutral or central position when a neutral steering input is applied by an operator of the vehicle, regardless of whether the coil spring is under tension or compression.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a side partial cross sectional view of a steering stabilizer in accordance with one embodiment of the present disclosure;

FIG. 2 is an enlarged elevation view of the spring seat shown in FIG. 1;

FIG. 3 is an enlarged cross sectional view of a portion of the steering stabilizer better showing the one-piece spring seat secured to the damper housing by the retaining rings;

FIG. 4 is an elevation view of just the damper housing better showing the grooves formed on the outer surface thereof which engage with the pair of retaining rings.

FIG. 10 is a simplified cross sectional side view of another embodiment of the single piece spring seat in which the single piece spring seat incorporates a primary component and a secondary collar arranged coaxially over the primary component;

FIGS. 11 and 12 illustrate a tab formed on the inside surface of the secondary component, and a groove formed on the outside surface of the primary component, for allowing a degree of axial adjustment of the secondary collar on the primary component;

FIG. 13 is an end view of the secondary collar of FIG. 12;

Figure 15:
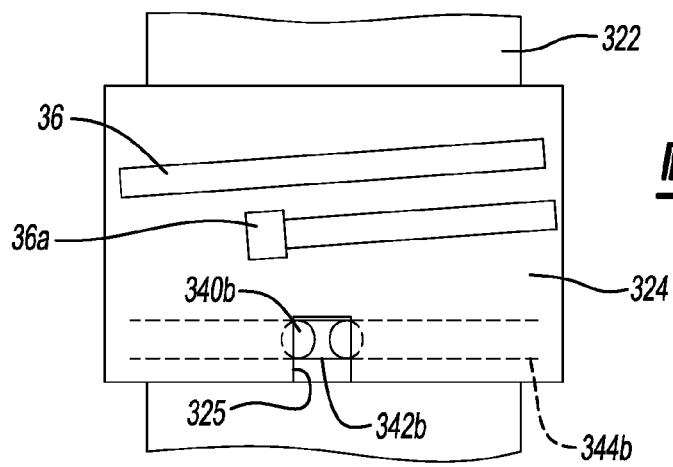
Figure 16:
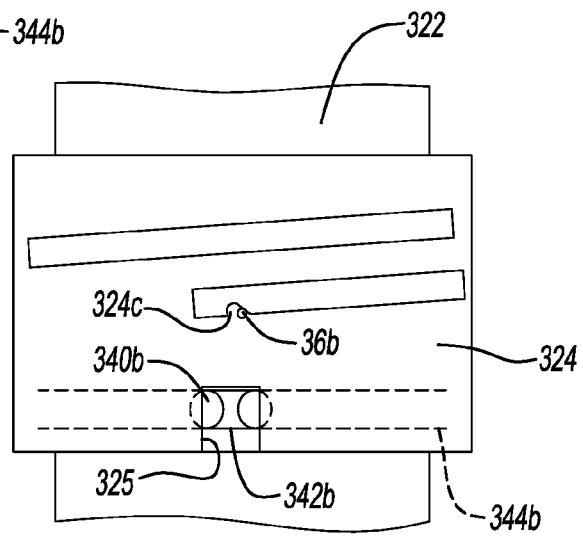

FIG. 15 is a simplified side view of the single piece spring seat of FIG. 10 but incorporating a modified helical groove which includes an enlarged area end portion for engaging with a flattened distal end portion of the spring, which serves to lockout rotation of the single piece spring seat on the damper housing; and FIG. 16 is a simplified side view of the single piece spring seat of FIG. 10 but instead incorporating a coil spring having a notch at its distal end, which engages with a tab formed in the spring seat, for locking out rotation of the spring seat on the damper housing.

Corresponding reference numerals indicate corresponding parts throughout the several views of the drawings.

DETAILED DESCRIPTION

Example embodiments will now be described more fully with reference to the accompanying drawings.

Referring to FIG. 1 a steering stabilizer system 10 is shown in accordance with one embodiment of the present disclosure. The steering stabilizer system 10 (hereinafter simply "steering stabilizer" 10) forms a "self-centering", as known as a "Return-To-Center" (RTC), steering stabilizer. The steering stabilizer 10 includes a damper 12 having an inner adapter assembly 14, a telescoping piston rod 16, an outer adapter assembly 18 and a coil spring 20. The coil spring 20 is disposed over the piston rod 16 and an outer housing 22 of the damper 12. A spring seat 24 is used to engage a first end 20a of the coil spring 20 and to hold the first end fixedly relative to the outer housing 22 of the damper 12.

A second end 20b of the coil spring 20 is held fixedly to a distal end 16a of the piston rod 16. This is accomplished by a hex jam nut 26 secured via a bushing assembly (e.g., an elastomeric busying assembly) fixedly to the piston rod 16, a retainer member 27, a spring seat washer 28, a backing washer 30, a pivot nut 32, and a threaded-on portion 18a of the outer adapter assembly 18. These components capture the second end 20b of the coil spring 20 and maintain the second end coaxially aligned with an axial center of the piston rod 16. As such, the second end 20b of the coil spring 20 is stretched or extended when the piston rod 16 moves telescopically outward from the damper housing 22 (i.e., to the left in FIG. 1), and is retracted (i.e., moved to the right) when the piston rod 16 is retracted partially within the damper housing 22.

The inner adaptor assembly 14 may be secured via a bushing assembly (e.g., an elastomeric bushing assembly) to one of a portion of an undercarriage of the vehicle, or possibly to a stabilizer bar or other part of the vehicle that does not rotate with the steering wheel, while the outer adapter assembly 18 may be secured to a tie rod, cross over linkage or other steering component that moves as the steering wheel rotates, or any other component associated with either a wheel or a steering component of the vehicle. Or this coupling may be reversed such that the inner adaptor assembly 14 is secured to the wheel component and the outer adaptor assembly 18 is secured to one of the undercarriage or stabilizer bar.

The one-piece spring seat 24 forms a unique one-piece configuration which can be attached even more easily and positively to the housing 22 of the damper 12 than previous designs of spring seats used with steering stabilizers. As shown in FIG. 1, the one-piece spring seat 24 includes a one-piece body portion 34 formed from a suitably strong material, for example aluminum, or possibly even high strength plastic. The one-piece body portion 34 is a tubular component having a helical groove 36 formed thereon. The outer diameter of the spring seat 24, as well as the depth of the helical groove 36 and its overall circumferential length, enable a portion of the first end 20a of the coil spring 20, and preferably the first two coils of the coil spring, to be threaded on to helical groove 36 during assembly. The first end 20a of the coil spring 20 may thus be threaded onto the one-piece body portion 34 until a terminal end of the coil spring 20 abuts point 38 on the one-piece body portion 34.

With further reference to FIGS. 1 and 3, the one-piece body portion 34 may be held fixedly on the housing 22 of the damper 12 by at least one retaining ring, but more preferably by a pair of the retaining rings 40a and 40b, that abut opposite ends of the one-piece spring seat 24. Each retaining ring 40a/40b forms a generally circular split ring that is seated in an associated groove 42a or 42b on an outer surface 22a of the damper housing 22. The grooves 42a and 42b on the damper housing 22 can be seen particularly well in FIG. 4. In this example the damper housing 22 forms the reserve tube of the damper 12. The grooves 42a and 42b each have a depth dimension which enables a portion of its associated retaining ring 40a or 40b to rest partially within its associated groove 42a or 42b. An inside surface 44 of the one-piece body portion 34 of the one-piece spring seat 24 similarly includes circumferential grooves 44a and 44b formed at each opposite end of the one-piece body portion 34. In this example grooves 42a and 42b have different depth dimensions, with groove 42a having a depth dimension slightly less than that of the groove 42b. The smaller depth dimension of groove 42a, in cooperation with the circumferential groove 44a, provides just a minimal clearance with an inside wall surface of groove 44a when the ring 40a is installed in the groove 44a and the one-piece spring seat 24 is slid over the damper housing 22 during assembly. This minimal clearance eliminates the possibility of an axial load being applied to the retaining ring 40a "pushing" the retaining ring 40a axially out of the groove 42a. In effect, the minimal radial clearance provided by the groove 44a prevents any tangible expansion of the retaining ring 40a in response to an axial load.

Groove 42b, as noted above, is larger (i.e., greater in depth) than groove 42a to facilitate easy assembly of the retaining ring 40b. More specifically, the greater depth of the groove 42b provides the additional clearance needed to allow the retaining ring 40b to be expanded during installation of the spring seat 24 onto the damper housing 22. During installation the retaining ring 40b is slid onto and over the damper housing 22 while the retaining ring 40b is held in an expanded orientation using a suitable tool. The retaining ring 40b seats in groove 42b. The one-piece spring seat 24 is then slid onto the damper housing 22 and moved axially down the damper housing 22 until the groove 44b engages the retaining ring 40b. The retaining ring 40a is then slid onto and axially down the damper housing 22 while held in an expanded condition. The retaining ring 40a engages in the groove 42a, and at this point the spring seat 24 is held axially at a predetermined position on the damper housing 22. Thus, the retaining rings 40a and 40b capture the one-piece spring seat 24 on the damper housing 22 at a precise axial location and prevent any tangible axial movement of the one-piece spring seat 24 along the damper housing 22. The coil spring 20 can then be threaded onto the one-piece spring seat 24 and the remainder of the steering stabilizer 10 assembled. It will be appreciated, however, that while the above description references two retaining rings 40a and 40b for securing the spring seat 24 stationary on the damper housing 22, as noted in the embodiment shown in FIG. 5 below, it is possible to use just a single retaining ring to axially secure the one-piece spring seat 24.

This above described construction of the one-piece spring seat 24 and the retaining rings 40a/40b, grooves 42a/42b and grooves 44a/44b makes for an extremely fast assembly process. The assembly process does not require manually threading in fasteners, which is required with a conventional two-piece spring seat assembly. The use of split retaining rings 40a/40b, grooves 42a/42b and grooves 44a/44b also eliminates any possibility of a threaded fastener coming loose and compromising operation of the steering stabilizer 10. Furthermore, the one-piece spring seat 24 is overall inherently more robust than conventional two-piece spring seat components. And the one-piece configuration of the spring seat 24 does not suffer from potential alignment issues of the two halves, which often require a larger helical groove width to be employed with two piece spring seat designs. The steering stabilizer 10 provides the significant benefit in that the fixedly secured one-piece spring seat 24 enables the coil spring 20 to always return to a center or neutral position. Thus, when the coil spring 20 is extended and under tension, and then as the operator of the vehicle turns the steering wheel to the center or neutral position, the coil spring will assist in pulling the outer adaptor assembly 18 to the right in FIG. 1 until the steering stabilizer 10 is returned to its center position. Likewise, if the coil spring 20 is compressed, as the user returns the steering wheel to the center position, the coil spring 20 will assist in pushing the outer adaptor assembly 18 to the left in FIG. 1 to return the steering stabilizer 10 to its center or neutral position.

Figure 5:
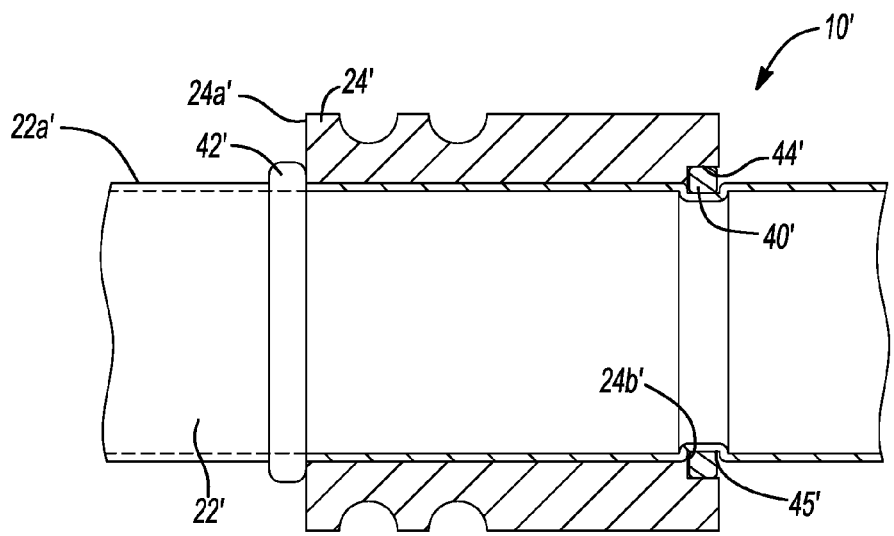
FIG. 5 shows an alternative embodiment of a steering stabilizer in accordance with the present disclosure in which only a single retaining ring is used to secure the one-piece spring seat on an outer surface of the damper housing.

Referring to FIG. 5, a steering stabilizer 10' in accordance with another embodiment of the present disclosure is shown. The steering stabilizer 10' is substantially identical to the steering stabilizer 10 with the exception that a complete, or at least partial, circumferential rib 42' is formed on an outer surface 22a' of a damper housing 22'. In this embodiment there is no groove 44a formed on the ID of a one-piece spring seat 24'; instead, an edge 24a' of the one-piece spring seat 24' abuts against the circumferential rib 42', which prevents axial movement of the one-piece spring seat 24' toward the left in the drawing of FIG. 5. An opposite end of the one-piece spring seat 24' includes a groove 44' on its inner surface which may be identical or substantially identical to the groove 44b, and which is at least substantially axially aligned with a groove 45' formed in an outer surface of the damper housing 22'. A single retaining ring 40' is positioned in the groove 45' during assembly. As the single retaining ring 40' is fully inserted into the groove 44' and released, it expands radially outwardly and a portion thereof abuts surface edge 24b' of the one-piece spring seat 24'. This prevents any tangible axial movement of the one-piece spring seat 24' toward the right in the drawing of FIG. 5. The coil spring (not shown) may then be assembled onto the one-piece spring seat 24' in the same manner as described for steering stabilizer 10. The single retaining ring design for steering stabilizer 10' may even further simplify assembly procedures and reduce the overall cost of the steering stabilizer 10'.

Another feature of the above described embodiment of the spring seat 24 using dual retaining rings 40a and 40b is to provide overload protection on both of the retaining rings. To accomplish this, it is necessary to have the axial distance between the two retaining rings 40a and 40b be larger than the axial distance between the two grooves 44a and 44b in the spring seat 24. In this way, the spring seat 24 can translate slightly to accommodate assembly of the retaining ring 40a. In one preferred embodiment the axial distance between the rings 40a and 40b and the axial distance between the grooves 42a and 42b is no more than one diameter of the retaining ring (i.e., either retaining ring 40a or 40b, which in this example may have the same diameter).

As the spring seat 24 is loaded it will translate to a position over the retaining ring 40a where the overload protection is achieved. If loaded in the reverse direction, translation of spring seat 24 will again occur causing a portion thereof to translate over the second retaining ring 40b whereby overload protection is again provided.

Figure 6:
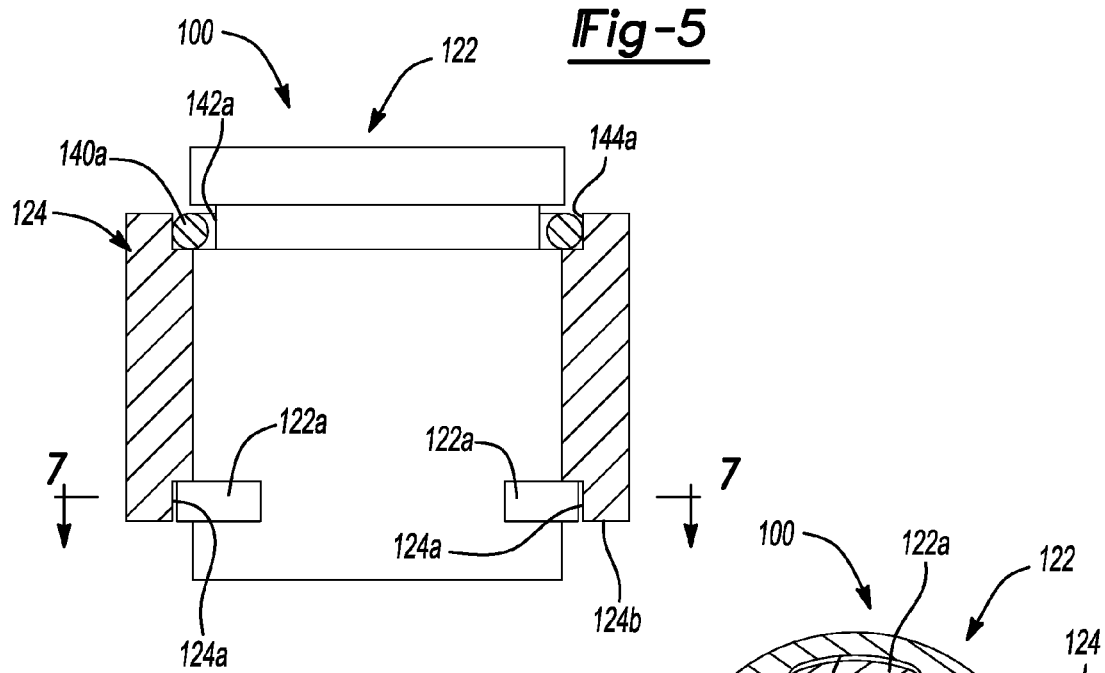
FIG. 6 is a simplified cross sectional side view of another embodiment of the single piece spring seat in which raised sections are formed on an outer surface of the outer wall of the damper housing, which engage with a plurality of cutout sections or notches on an inside surface of the spring seat to prevent the spring seat from rotating on the damper housing.
Figure 7:
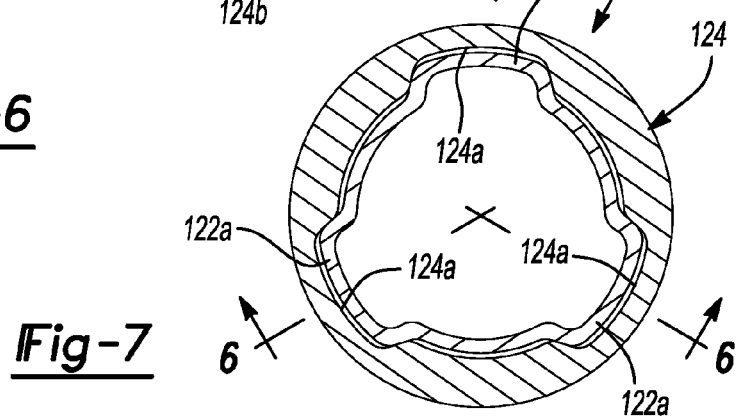
FIG. 7 is a simplified cross sectional end view of the assembly of FIG. 6.

A steering stabilizer 100 in accordance with another embodiment of the present disclosure is shown in FIGS. 6 and 7. Steering stabilizer 100 is identical to the steering stabilizer 10 with the exception of the construction of a damper housing 122 and a one piece spring seat 124, and as such the various other components of the steering stabilizer (e.g., spring 20, outer adapter assembly 18, etc.) described in connection with the steering stabilizer 10 are not shown in FIGS. 6 and 7. The steering stabilizer 100 only requires a single retaining ring 140a to hold the spring seat 124 at a precise axial position on the damper housing 122. Components or features in common with the steering stabilizer 10 are denoted with reference numerals increased by 100 in FIGS. 6 and 7.

The steering stabilizer 100 makes use of a single piece spring seat 124 that uses just the single retaining ring 140a at an upper end thereof. The single retaining ring 140a is held partially in a groove 142a in the damper housing 122. In this embodiment the lower retaining ring and lower reserve tube groove are not required. Instead of a groove that is formed as a full 360 degree groove in an outer surface of the damper housing 122, the outer surface wall of the damper housing 122 is raised in a plurality of separate positions, as indicated by raised housing sections 122a. In this embodiment three separate raised housing sections 122a are used, although it will be appreciated that a greater or lesser number of raised housing sections 122a could be used. Three raised housing sections 122a allows the load from the spring to be even distributed about the spring seat 124. The use of three raised housing sections 122a also provides an important benefit in that it provides a means for preventing rotation of the second end (i.e., inner or lower end) of the spring 20. Note that the rod side (i.e., outer or upper end) of the spring 20, as shown in FIG. 1, already has a spring anti-rotation prevention feature. The three raised housing sections 122a are further located on the outer wall of the damper housing 122 such that they each can be received between adjacent pairs of three spaced apart lower grooves 124a formed on an inner surface of spring seat 124 adjacent its lower edge 124b. In this manner the interlocking raised housing sections 122a and the spaced apart grooves 124a not only operate to hold the spring seat 124 at a precise axial position on the damper housing 122, but to prevent rotation of the spring seat as well.

It will also be appreciated that the raised housing sections 122a and the grooves 124a could be potentially reversed so they are disposed at the upper end of the spring seat 124 instead. But since peak loading is typically in compression and directed toward the inner adaptor assembly 14 (FIG. 1), it is believed that locating the raised housing sections 122a and grooves 124a at the lower end of the spring seat 124 will be preferred in most applications.

Figure 8:
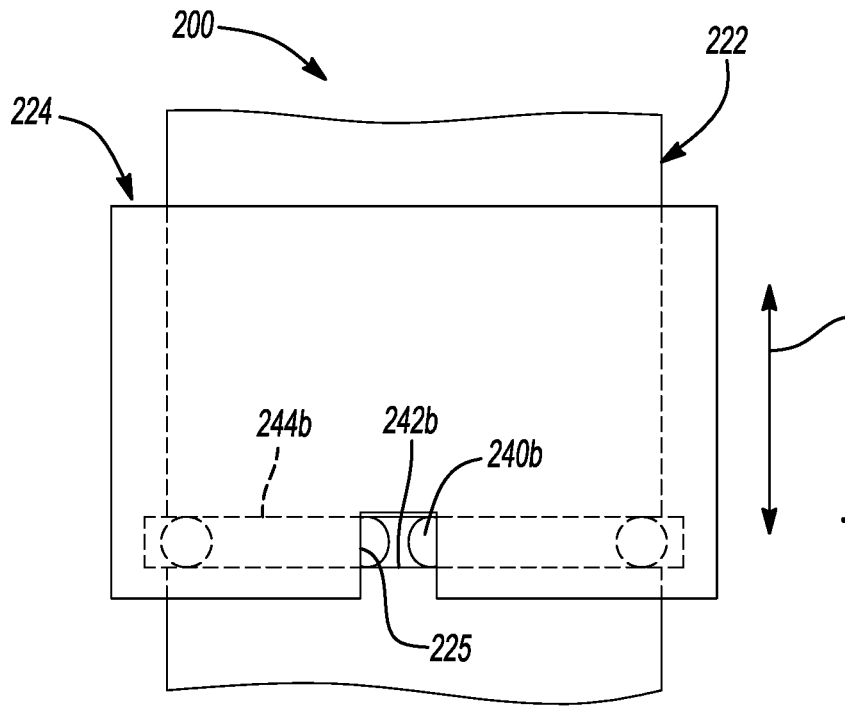
FIG. 8 is a simplified side view of another embodiment of the single piece spring seat showing the spring seat incorporating a cutout section which allows access to the single retaining ring being used to hold the spring seat on the damper housing.
Figure 9:
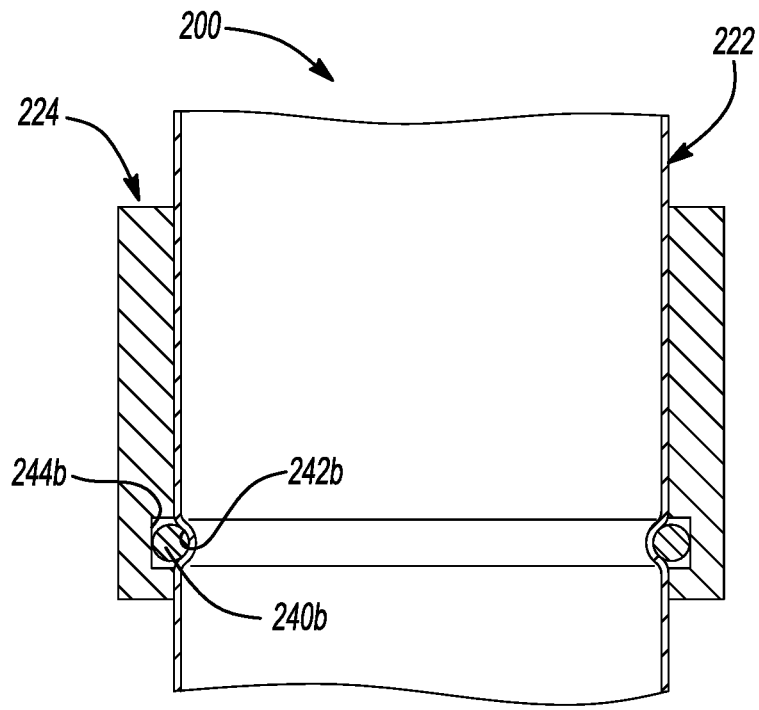
FIG. 9 is a simplified cross sectional side view of the assembly of FIG. 8.

Referring to FIGS. 8 and 9, a steering stabilizer 200 is shown in accordance with yet another embodiment of the present disclosure. Again, with the steering stabilizer 200, only the connection between a single piece spring seat 224 and an outer wall of a damper housing 222 has been changed from the steering stabilizer 10 described in connection with FIG. 1. Components in common with the steering stabilizer 10 have been denoted with reference numbers increased by 200.

The single piece spring seat 224 is again used with just a single retaining ring 240b and single groove 242b at a lower end of the spring seat 224. In this embodiment, the single retaining ring 240b is used to resist movement of the spring seat 224 in both the up and down axial directions as indicated by arrow "A" in FIG. 8. The spring seat 224 makes use of just a single internal groove 244b having a depth (i.e. internal diameter) sufficient to allow the diameter of the retaining ring 240b to increase sufficiently during assembly. That is, during assembly, the retaining ring 240b is originally compressed to reduce the diameter so that it will slide inside the spring seat 224. Once the retaining ring 240b reaches the location of the single internal groove 244b, the retaining ring 240b snaps back (i.e., expands radially outwardly) to its original diameter. However, when the retaining ring 240b is positioned on the outer wall of the damper housing 222, the diameter of the retaining ring increases (i.e., the retaining ring is expanded radially outwardly). The diameter stays in this expanded condition as the retaining ring 240b is slid along the outer wall of the damper housing 222 until the retaining ring reaches the groove 242b. At this point the retaining ring 240b snaps into the groove 242b in the outer wall of the damper housing 222. In this position, the retaining ring is in both the groove 242b of the damper housing 222 and the groove 244b on an inside wall portion of the spring seat 224. In this embodiment a small cutout section 225, possibly on the order of 0.25"-0.50" in circumferential length, of the outer wall of the spring seat 224 may also be removed in close proximity to the ends of the retaining ring 240b. It will also be appreciated that instead of the cutout section 225, a hole could be located in the outer wall.

The cutout section 225 serves a dual purpose. First, during assembly, when the axial translation of the retaining ring 240b happens on the damper housing 222, this can cause the outer coating (i.e., painting) of the damper housing 222 to become damaged. But since the cutout 225 is present, a tool can be used to hold the retaining ring 240b in a sufficiently expanded position as it is moved over the damper housing 222 towards the groove 242b, and the clearance provided by the cutout section 225 allows the installer to insert the retaining ring 240b into the groove 242b. Without the cutout section 225, the installer would not be able to position the retaining ring 240b over the groove 242b because of the interference with the spring seat 224. This allows installation of the retaining ring 240b to be carried out while avoiding any possible damage or scuffing to the outer surface coating on the damper housing 222. Second, if service is required on the spring seat 224, the cutout section 225 provides access to the ends of the retaining ring 240b by a suitable tool to thus facilitate removal of the retaining ring and the spring seat 224.

A steering stabilizer 300 in accordance with another embodiment of the present disclosure is shown in FIG. 10. Again, only the construction of the damper housing 322 and the single piece spring seat 324 differs from the steering stabilizer 10. Components in common with the steering stabilizer 10 are denoted with reference numbers increased by 300. The single piece spring seat 324 in this embodiment accommodates user selectable spring stiffness in a shock that provides resistance to loading in both tension and compression. This performance is achieved by separating the spring retaining helical groove of the spring seat 324 so that a coaxially arranged two piece spring seat having a primary component 324a and a secondary collar 324b is provided. The axial movement prevention features of the retaining ring 340b remain unchanged on the primary component 324a, and are therefore identical in most respects with the spring seat 224 of FIG. 8, with the exception of a circumferential shoulder 324a1 formed on an outer diameter of the primary component 324a. Therefore, the spring seat 324 incorporates a cutout section 325, an internal groove 344b, a retaining ring 340b, and a groove 342b formed on the outer surface of the damper housing 322. To provide adjustable tension on the spring (e.g., spring 20 shown in FIG. 1), the secondary collar 324b has a tab 324b1 that rides within a stepped groove 324a3 of the primary component 324a as shown in Figures 11 and 12. The secondary collar 324b with its tab 324b1 projecting radially inwardly is shown in FIG. 13. By rotating the secondary collar 324b on the non-translatable primary component 324a, the axial position of the secondary collar 324b is modified. Linear groove 324a2 provides a path for inserting the tab 324b1 into the stepped groove 324a3 when the secondary collar 324b is slid over the primary component 324a during assembly. And it will also be appreciated that the tab 324b1 and groove 324a3 could be swapped on these two components.

Figure 14:
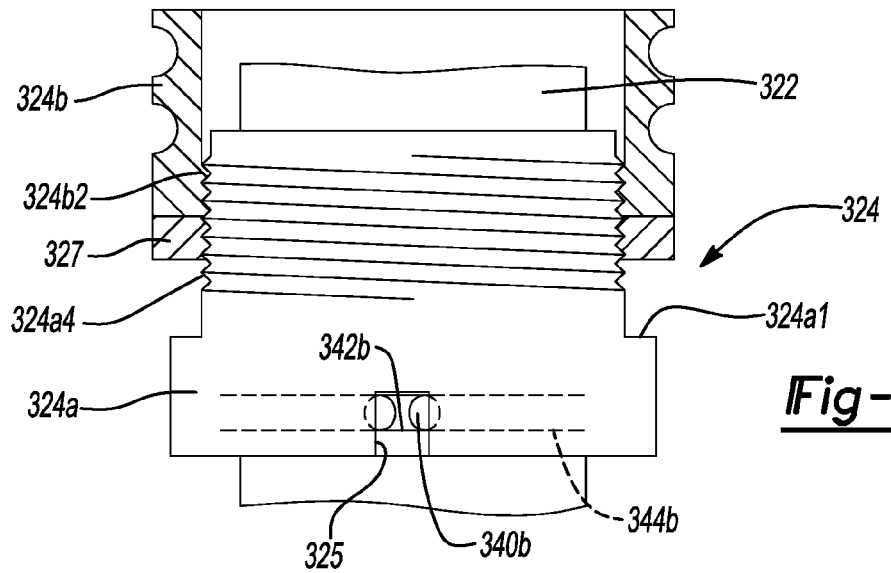
FIG. 14 is another embodiment of the single piece spring seat showing a threaded engagement between the primary component and the secondary collar, and a separate lock nut being used to lock the secondary collar at a desired axial position on the primary component.

As an alternate height adjustment, the non-translatable primary component 324a shown in FIG. 10 can be provided with a male thread 324a4 and the secondary collar 324b can be provided with a female thread 324b2, as shown in FIG. 14. The thread joint 324a4/324b2 is used to adjust the axial position of the secondary collar 324b on the primary component 324a. A locking nut 327 may then be provided to lock the components 324a and 324b in the desired axial position.

In some instances there may be a need to lockout the rotation of the single piece spring seat 324 on the damper housing 322. Using the three raised sections 122a and cutout sections 124a as described herein is one option. Another option is to smash the end of the spring 20 to a slightly larger diameter and machine the helical groove 36 in the spring seat 324 with a slightly larger cross sectional shape 36a to accommodate the larger diameter distal end portion of the spring 20, as shown in FIG. 15. Still another alternative arrangement is shown in FIG. 16, which involves forming a notch 36b in the helical groove 36 at its distal end portion, which has a small tab 324c. Still further alternative ways that the spring 20 can be prevented from rotating are changing the coil-to-coil gap to have less distance at the distal end of the coil spring 20. The coil-to-coil gap at the end of the spring 20 would initially need to expand to fit the wider coil-to-coil spacing at the start of the helical groove 36 on the spring seat 324.

Still further, the radius of the coil spring 20 can be changed to a smaller radius at its distal end. The radius of the coil spring 20 would initially need to expand to fit the larger diameter of the start of the helical groove 36 of the spring seat 324. Still further, the bottom of the helical groove 36 may be raised in a location away from the distal end to prevent spring walkout over repeat loading. Still further, a threaded fastener or pin could be placed in the spring seat 324 to pinch the spring seat against the outer wall of the damper housing 322.

Yet another option for eliminating rotation of the spring seat 24 would be the use of a standard set screw that is threaded into a threaded bore of the spring seat and makes contact with the outer surface of the damper housing 22. Such an arrangement is highly cost effective and would not significantly complicate the assembly of the system 10. When loosened, the set screw would allow the spring seat 24 to slide and rotate freely for assembly, but when the set screw is fully tightened, it would prevent unwanted rotation of the spring seat.

Still another advantage of each of the single piece spring seats 24, 124, 224 and 324 described herein provide over the prior art is that the well known prior art two piece spring seat configuration requires a larger coil groove diameter to accommodate misalignment between the helical grooves of the two halves of the mating spring seat. Without the larger grooves, any misalignment of the two halves of the two piece spring seat will prevent the end of the spring from being threaded onto the grooves of the assembled halves. Therefore, by having a one-piece spring seat with a continuous helical groove, it is no longer necessary to have tight tolerance control during manufacturing, which is otherwise required when using two spring seat halves.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A steering stabilizer for a vehicle, comprising:
   a damper having a housing and a piston rod extending telescopically from the housing;
   a coil spring disposed over the damper;
   an inner adapter assembly operably associated with the damper for securing a first end of the damper to one of a wheel component or a body component of the vehicle;
   an outer adapter assembly operably coupled to a distal end of the piston rod for coupling to the other one of the wheel component or the body component of the vehicle;
   a one-piece spring seat fixedly coupled to the housing of the damper so as to be held stationary relative to the housing;
   a coil spring supported at a first end by the one-piece spring seat and at a second end by the outer adapter assembly, wherein the one-piece spring seat reacts from a load from the coil spring to return the steering stabilizer to a neutral or central position when a neutral steering input is applied by an operator of the vehicle, regardless of whether the coil spring is under tension or compression, wherein the housing includes one of a protrusion and a recess and the one-piece spring seat includes the other of the protrusion and the recess such that the protrusion is positioned within the recess to restrict relative rotation between the housing and the one-piece spring seat; and
   a retaining ring configured to engage a portion of the housing of the damper and a portion of the one-piece spring seat to assist in holding the one-piece spring seat axially stationary on the housing of the damper.

2. The steering stabilizer of claim 1, wherein the retaining ring and the protrusion are axially spaced apart from one another.

3. A steering stabilizer for a vehicle, comprising:
   a damper having a housing and a piston rod extending telescopically from the housing;
   a coil spring disposed over the damper;
   an inner adapter assembly operably associated with the damper for securing a first end of the damper to one of a wheel component or a body component of the vehicle;
   an outer adapter assembly operably coupled to a distal end of the piston rod for coupling to the other one of the wheel component or the body component of the vehicle;
   a one-piece spring seat fixedly coupled to the housing of the damper so as to be held stationary, both axially and rotationally, relative to the housing, the one-piece spring seat including:
      a retaining ring configured to engage a portion of the housing of the damper and a portion of the one-piece spring seat to assist in holding the one-piece spring seat axially stationary on the housing of the damper;
      a projection radially outwardly extending from the housing, the one-piece spring seat including a recess in receipt of the projection to assist in holding the one-piece spring seat stationary on the housing of the damper; and
   a coil spring supported at a first end by the one-piece spring seat and at a second end by the outer adapter assembly, wherein the one-piece spring seat reacts a load from the coil spring to return the steering stabilizer to a neutral or central position when a neutral steering input is applied by an operator of the vehicle, regardless of whether the coil spring is under tension or compression.

4. The steering stabilizer of claim 3, wherein the housing includes multiple circumferentially spaced apart protrusions and the one-piece spring seat includes a corresponding number of recesses, each of the recesses being in receipt of one of the protrusions to define a pair such that a load is shared by the multiple protrusion and recess pairs when restricting rotation between the housing and the one-piece spring seat.

5. The steering stabilizer of claim 3, wherein the recess inwardly extends from an end face of the one-piece spring seat.

6. The steering stabilizer of claim 3, wherein the housing includes a substantially constant wall thickness at a location of the protrusion.

7. The steering stabilizer of claim 3, wherein the protrusion extends radially and only partially into a wall of the one-piece spring seat.

8. A steering stabilizer for a vehicle, comprising:
   a damper having a housing and a piston rod extending telescopically from the housing;
   a coil spring disposed over the damper;

an inner adapter assembly operably associated with the damper for securing a first end of the damper to one of a wheel component or a body component of the vehicle;

an outer adapter assembly operably coupled to a distal end of the piston rod for coupling to the other one of the wheel component or the body component of the vehicle;

a one-piece tubular spring seat fixedly coupled to and circumferentially surrounding the housing of the damper so as to be held stationary relative to the housing, the one-piece tubular spring seat including:

a retaining ring;

a first groove formed on an outer surface of the housing of the damper;

a second groove formed on an inner surface of the one-piece spring seat, and wherein the retaining ring engages both of the first and second grooves to hold the one-piece tubular spring seat axially stationary on the housing;

an anti-rotation device restricting rotation between the one-piece tubular spring seat and the housing;

a coil spring supported at a first end by the one-piece spring seat and at a second end by the outer adapter assembly, wherein the one-piece tubular spring seat includes an outer surface and a helical groove formed thereon, the first end of the coil spring being positioned within the helical groove; and wherein the one-piece spring seat reacts a load from the coil spring to return the steering stabilizer to a neutral or central position when a neutral steering input is applied by an operator of the vehicle, regardless of whether the coil spring is under tension or compression.

9. The steering stabilizer of claim 8, wherein the retaining ring and the anti-rotation device are axially spaced apart from one another.

10. The steering stabilizer of claim 8, wherein the anti-rotation device includes a protrusion.

11. The steering stabilizer of claim 10, wherein the protrusion is integrally formed with the housing.

12. The steering stabilizer of claim 11, wherein the one-piece tubular spring seat includes a feature in direct contact with the protrusion.

\* \* \* \* \*